United States Patent
Kondoh

(10) Patent No.: US 10,359,446 B2
(45) Date of Patent: Jul. 23, 2019

(54) ANGULAR SPEED SENSOR CORRECTION DEVICE AND ANGULAR SPEED SENSOR CORRECTION METHOD FOR CORRECTING OUTPUTS FROM ANGULAR SPEED SENSOR

(71) Applicant: JVC KENWOOD Corporation, Yokohama-shi, Kanagawa (JP)

(72) Inventor: Takahiro Kondoh, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 432 days.

(21) Appl. No.: 15/256,225

(22) Filed: Sep. 2, 2016

(65) Prior Publication Data

US 2017/0074900 A1    Mar. 16, 2017

(30) Foreign Application Priority Data

Sep. 11, 2015 (JP) ................................ 2015-179829

(51) Int. Cl.
  *G01P 21/02* (2006.01)
  *G01C 21/16* (2006.01)
  *G01C 25/00* (2006.01)

(52) U.S. Cl.
  CPC ............ *G01P 21/02* (2013.01); *G01C 21/165* (2013.01); *G01C 25/005* (2013.01)

(58) Field of Classification Search
  CPC ...... G01P 21/02; G01C 21/165; G01C 25/005
  See application file for complete search history.

(56) References Cited

U.S. PATENT DOCUMENTS

| | | | |
|---|---|---|---|
| 8,185,308 B2* | 5/2012 | Watanabe | G01C 21/005 701/469 |
| 9,766,770 B2* | 9/2017 | Ebi | G01C 21/06 |
| 9,864,064 B2* | 1/2018 | Ishigami | G01C 21/28 |
| 2011/0295549 A1* | 12/2011 | Takabayashi | G01S 7/4004 702/142 |
| 2016/0216116 A1* | 7/2016 | Kourogi | G01C 21/12 |

FOREIGN PATENT DOCUMENTS

| | | |
|---|---|---|
| JP | 2001-330454 A | 11/2001 |
| JP | 2009-192495 A | 8/2009 |

* cited by examiner

*Primary Examiner* — Mohamed Charioui
(74) *Attorney, Agent, or Firm* — Brundidge & Stanger, P.C.

(57) ABSTRACT

A temperature gradient calculation unit calculates a temperature gradient based on the temperature from the temperature sensor and calculates an average temperature based on the temperature gradient. An offset gradient calculation unit calculates an offset value gradient based on the temperature gradient, the average temperature, and the temporary offset value of the angular speed sensor. A correction value calculation unit calculates the offset value of the angular speed sensor based on the offset value gradient and the temperature gradient.

3 Claims, 6 Drawing Sheets

| SAMPLE NUMBER | TIME | TEMPERATURE |
|---|---|---|
| 11 | 1.1 | 30.01 |
| 12 | 1.2 | 30.04 |
| 13 | 1.3 | 30.07 |
| 14 | 1.4 | 30.10 |
| 15 | 1.5 | 30.12 |
| 16 | 1.6 | 30.15 |
| 17 | 1.7 | 30.17 |
| 18 | 1.8 | 30.19 |
| 19 | 1.9 | 30.21 |
| 20 | 2.0 | 30.24 |
| 21 | 2.1 | 30.25 |

70

72

| TEMPERATURE RANGE | VALIDITY FLAG | AVERAGE TEMPERATURE | AVERAGE OFFSET VALUE |
|---|---|---|---|
| 20.0 | 1 | 20.33 | 2.41 |
| 20.5 | 1 | 20.78 | 2.44 |
| 21.0 | 1 | 21.11 | 2.45 |
| 21.5 | 1 | 21.90 | 2.44 |
| 22.0 | 0 | − | − |
| 22.5 | 1 | 22.71 | 2.47 |
| 23.0 | 1 | 23.38 | 2.50 |
| 23.5 | 0 | − | − |
| 24.0 | 1 | 24.33 | 2.54 |
| 24.5 | 1 | 24.72 | 2.53 |
| ... | ... | ... | ... |

400, 402, 404, 406

74

76

ANGULAR SPEED SENSOR CORRECTION DEVICE AND ANGULAR SPEED SENSOR CORRECTION METHOD FOR CORRECTING OUTPUTS FROM ANGULAR SPEED SENSOR

CROSS-REFERENCE TO RELATED APPLICATION

This application is based upon and claims the benefit of priority from the prior Japanese Patent Application No. 2015-179829, filed on Sep. 11, 2015, the entire contents of which are incorporated herein by reference.

BACKGROUND

1. Field

The present invention relates to an angular speed sensor correction technology and, more particularly, to an angular speed sensor correction device and an angular speed sensor correction method for correcting outputs from an angular speed sensor.

2. Description of the Related Art

In general, on-vehicle navigation devices are configured to estimate an optimal position by synthesizing the position calculated from a self-contained navigation system and the position calculated from a Global Positioning System. In a self-contained navigation system, the current position is calculated by updating the previously measured position based on the speed pulses indicating the speed of the vehicle and the angular swing speed of the vehicle measured by the angular speed sensor. The navigation devices of a scheme as described above is capable of deriving the position of the driver's vehicle even in tunnels, underground parking lots, or areas between tall buildings, in which it is difficult to receive radio waves from a GPS satellite, by using the self-contained navigation system. The angular speed co of a circling vehicle can be derived according to the following expression.

$$\omega = (V_{out} - V_{offset})/S \quad (1)$$

where $V_{out}$ denotes an output voltage of the angular speed sensor, $V_{offset}$ denotes an offset value of the angular speed sensor, and S (mV/deg/sec) denotes a sensitivity coefficient of the angular speed sensor.

In order to determine the angular speed accurately, it is necessary to determine the offset value and the sensitivity coefficient of the angular speed sensor. The sensitivity coefficient of the angular speed sensor generally varies depending on the difference between individual angular speed sensors and the angle of mounting the angular speed sensor to the vehicle. The offset value may change with temperature. More specifically, the offset value is affected by temperature change due to heat dissipated from a substrate, etc. used in the on-vehicle navigation device and heat dissipated by the vehicle engine etc. when the on-vehicle navigation device is mounted to the dashboard of the vehicle. In the related art, the offset value of the angular speed sensor is corrected by the voltage output from the angular speed sensor when the vehicle comes to a stop or is traveling in a straight line, when the angular speed becomes "0". However, in cases where the frequency that the vehicle comes to a stop is small, such as when the vehicle is traveling on a high way or traveling for a long period of time in an area with little traffic, it is difficult to correct the offset value of the angular speed sensor periodically. As a result, the prevision of the offset value is likely to become poor. Offset value correction performed while the vehicle is traveling in a straight line to cause the output voltage from the angular speed sensor to become "0" accurately is also affected by road conditions or conditions of driving by the driver. It is therefore difficult to perform accurate offset value correction periodically. The sensitivity coefficient of the angular speed sensor is derived from the amount of orientation change in a unit period of time and the output voltage from the angular speed sensor. For this reason, the sensitivity coefficient of the angular speed sensor is affected by errors in the offset value, as is evident from from expression (1).

There is proposed a technology to correct the offset value and the sensitivity coefficient of an angular speed sensor even while the vehicle is not traveling in a straight line. According to this technology, the offset value and the sensitivity coefficient of the angular speed sensor are corrected based on the average value of output voltages of the angular speed sensor over a predetermined period of time and the amount of orientation change of the vehicle during the period of time over which the average value is calculated. More specifically, the offset value $V_{offset}$ of the angular speed sensor is calculated as follows.

$$V_{offset} = 1/n \cdot \Sigma V_{out} - 1/\Delta t \cdot \Delta \theta / n \cdot S \quad (2)$$

where n denotes the number of samples of output voltages of the angular speed sensor, $\Delta t$ (sec) denotes a sampling interval, and $\Delta \theta$(deg) denotes the amount of orientation change. The amount of orientation change is determined based on a GPS-based orientation acquired from a GPS satellite or on map data. The sensitivity coefficient of the angular speed sensor is derived as follows while the amount of change of the corrected offset value is small, i.e., while the amount is stable.

$$S = (1/n \cdot \Sigma V_{out} - V_{offset}) \cdot n / \Delta \theta \cdot \Delta t \quad (3)$$

where $V_{offset}$ is assumed to be known and a constant value in a stable condition in which the amount of change of the corrected offset value is small (see, for example, patent document 1).

There is also proposed a technology to correct the offset value of an angular speed sensor even in a situation where radio waves from a GPS satellite cannot be received, such as when the vehicle is traveling indoors. According to this technology, the relationship between the temperature measured by a temperature sensor and the offset value is approximated by a function, and the gradient of the offset value in the neighborhood of the measured temperature is calculated accordingly. More specifically, the offset correction value $\Delta V_{offset}$ in the presence of temperature change is calculated as follows based on the gradient of the offset value.

$$\Delta V_{offset} = \beta \cdot (T_{now} - T_{old}) \quad (4)$$

where $\beta$(mV/° C.) denotes the gradient of offset, $T_{now}$ denotes the temperature currently measured, and $T_{old}$ denotes the temperature previously measured. By adding the offset correction value to the offset value determined when the temperature was measured previously, the current offset value is derived (see, for example, patent document 2).

[patent document 1] Japanese Patent Application Laid-open No. 2001-330454

[patent document 2] Japanese Patent Application Laid-open No. 2009-192495

If the frequency of correcting the offset value is increased in this situation, it may take time to track the true offset value unless the resolution of the temperature sensor is sufficient.

For example, if the resolution of the temperature sensor is 0.1° C., the offset correction value cannot be detected unless the difference between $T_{now}$ and $T_{old}$ in expression (4) is 0.1° C. or greater. Therefore, it takes time before the offset value is corrected such as when the temperature inside the vehicle is increased only slightly. In order to increase the precision of deriving the angular speed in a situation where the ambient temperature changes mildly, it is required to derive the offset value of the angular speed sensor in a short period of time and with a high precision.

SUMMARY

To address the aforementioned issue, the angular speed sensor correction device according to a mode of an embodiment comprises: an acquisition unit that acquires positioning data for a target positioned based on a signal from a GPS satellite, an angular speed of the target output from an angular speed sensor, and a temperature of the target output from a temperature sensor; an offset value derivation unit that derives a temporary offset value of the angular speed sensor based on the positioning data and the angular speed acquired by the acquisition unit; and an offset value correction unit that derives the offset value of the angular speed sensor based on the temporary offset value of the angular speed sensor derived by the offset value derivation unit and the temperature acquired by the acquisition unit. The offset value correction unit comprises: a temperature gradient calculation unit that calculates a temperature gradient based on the temperature acquired by the acquisition unit and calculates an average temperature based on the temperature gradient; an offset gradient calculation unit that calculates an offset value gradient based on the temperature gradient and the average temperature calculated by the temperature gradient calculation unit and on the temporary offset value of the angular speed sensor derived by the offset value derivation unit; and a correction value calculation unit that calculates the offset value of the angular speed sensor based on the offset value gradient calculated by the offset gradient calculation unit and the temperature gradient calculated by the temperature gradient calculation unit.

Another mode of the embodiment relates to an angular speed sensor correction method. The method comprises: acquiring positioning data for a target positioned based on a signal from a GPS satellite, an angular speed of the target output from an angular speed sensor, and a temperature of the target output from a temperature sensor; deriving a temporary offset value of the angular speed sensor based on the positioning data and the angular speed acquired; and deriving the offset value of the angular speed sensor based on the temporary offset value of the angular speed sensor derived and the temperature acquired. The deriving of the offset value comprises: calculating a temperature gradient based on the temperature acquired and calculating an average temperature based on the temperature gradient; calculating an offset value gradient based on the temperature gradient and the average temperature calculated and on the temporary offset value of the angular speed sensor derived; and calculating the offset value of the angular speed sensor based on the offset value gradient calculated and the temperature gradient calculated.

Optional combinations of the aforementioned constituting elements, and implementations of the embodiment in the form of methods, apparatuses, systems, recording mediums, and computer programs may also be practiced as additional modes of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION

The invention will now be described by reference to the preferred embodiments. This does not intend to limit the scope of the present invention, but to exemplify the invention.

A summary of the present invention will be given before describing the invention in specific detail. An embodiment relates to an angular speed calculation device mounted to a vehicle etc. and configured to calculate the angular speed of a circling vehicle. The angular speed calculation device derives an angular speed by using the output voltage from the angular speed sensor in conjunction with the offset value and the sensitivity coefficient. In order to improve the precision of the angular speed, it is necessary to improve the precision of the offset value and the sensitivity coefficient. The precision of the offset value is improved by updates using a signal from a GPS satellite. Even if a signal from a GPS satellite cannot be received, the offset value can be updated by the temperature measured by a temperature sensor. In this process, it is desired to update the offset value in a short period of time and with a high precision even when the temperature change is mild. The angular speed calculation device according to the embodiment addresses this requirement by calculating the offset value by multiplying the gradient of the offset value with respect to the temperature and the gradient of the temperature with respect to time. Further, the period of time that should elapse before the temperature gradient is derived next time is adjusted based on the temperature gradient already derived.

Figure 1:
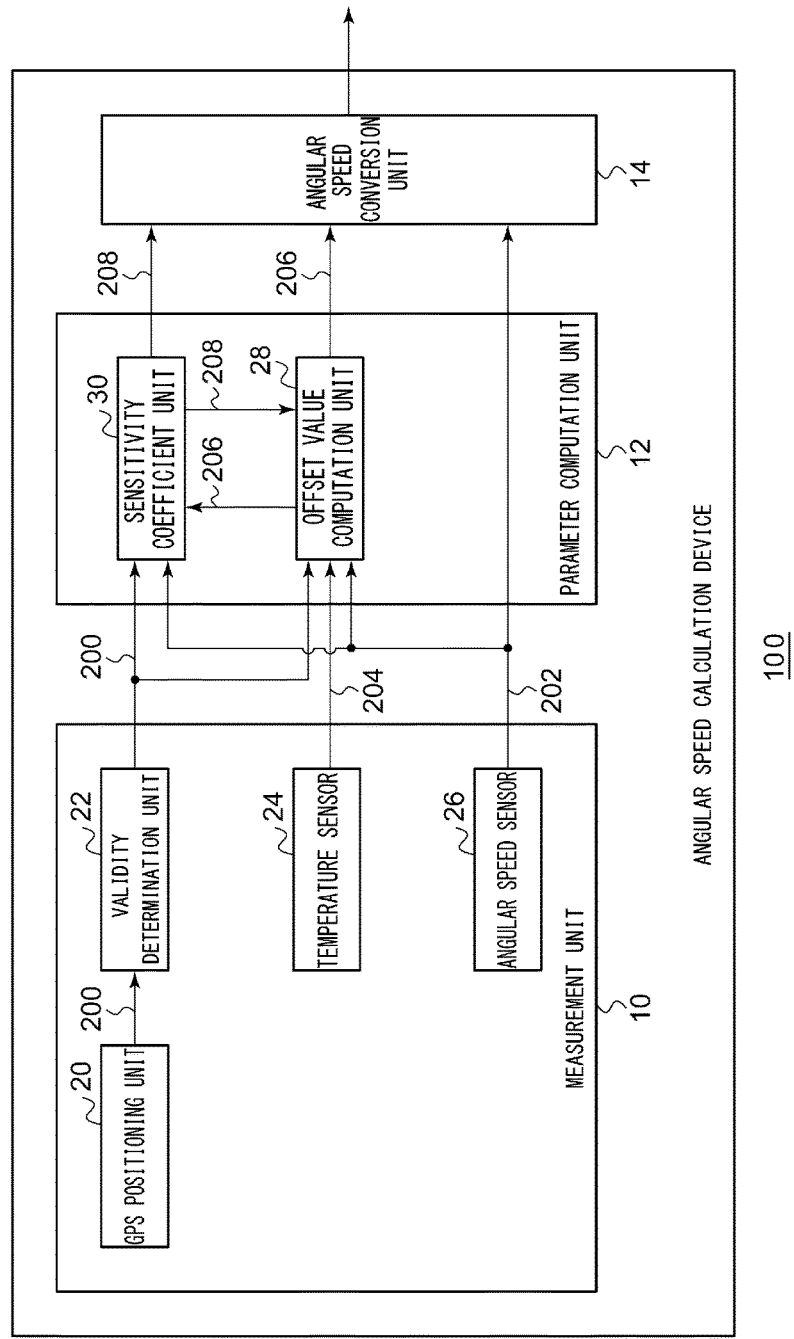
FIG. 1 shows composition of a configuration of an angular speed calculation device according to the embodiment.

FIG. 1 shows a configuration of an angular speed calculation device 100 according to the embodiment. The angular speed calculation device 100 includes a measurement unit 10, a parameter computation unit 12, and an angular speed conversion unit 14. The measurement unit 10 includes a GPS positioning unit 20, a validity determination unit 22, a temperature sensor 24, and an angular speed sensor 26. The parameter computation unit 12 includes an offset value computation unit 28 and a sensitivity coefficient computation unit 30. The angular speed calculation device 100 further include signals including GPS positioning data 200, angular speed data 202, temperature data 204, an offset value 206, and a sensitivity coefficient 208.

The GPS positioning unit 20 receives a signal from a GPS satellite (not shown) to calculate the GPS positioning data 200. The GPS positioning data 200 includes a latitude, a longitude, a GPS height indicating the height of the vehicle, a GPS speed indicating the speed of movement, a GPS-based orientation indicating the orientation of the vehicle, Position Dilution Precision (PDOP), the number of acquired satellites. PDOP is an indicator indicating how an error in the position of the GPS satellite in the GPS positioning data 200 is reflected in the position of reception and represents a positioning error. The GPS positioning data 200 may include other values. Calculation of the GPS positioning data may be performed using a publicly known technology so that a description thereof is omitted. The GPS positioning unit 20 calculates the GPS positioning data 200 at sampling intervals, i.e., periodically. The GPS positioning unit 20 outputs the GPS positioning data 200 to the validity determination unit 22 successively.

The validity determination unit 22 receives the GPS positioning data 200 from the GPS positioning unit 20 successively. The validity determination unit 22 refers to the GPS positioning data 200 and determines the validity of the respective GPS positioning data 200. For example, if the value of PDOP is equal to or lower than the first threshold value and the GPS speed is equal to or higher than the second threshold value, the validity determination unit 22 determines the associated GPS-based orientation to be valid. Further, if the above condition is not met, the validity determination unit 22 determines that the associated GPS-based orientation is invalid. This is because the precision of the GPS-based orientation generally tends to be lower if the value of PDOP is large or the GPS speed is low. To describe it further details, the validity determination unit 22 indicates the validity of the GPS-based orientation by using a flag, if the value of PDOP is equal to or smaller than 6 and the GPS speed is 20 km/h or higher.

Further, the validity determination unit 22 determines that the GPS speed is valid if the GPS speed is equal to or higher than the third threshold value. The third threshold value may be equal to the second threshold value. As a result of these steps, the validity determination unit 22 appends a flag indicating validity or invalidity to the values such as GPS-based orientation included in the GPS positioning data 200 (hereinafter, the GPS positioning data 200 to which the flag is appended will also be referred to as "GPS positioning data 200"). The validity determination unit 22 outputs the GPS positioning data 200 successively to the offset value computation unit 28 and the sensitivity coefficient computation unit 30.

The temperature sensor 24 represents, for example, a semiconductor temperature sensor, and is provided inside the angular speed sensor 26 or in the neighborhood thereof. In other words, the temperature sensor 24 detects the temperature of the angular speed sensor 26 or the temperature of the ambient space. The detected temperature is output as an analog signal of 0V-5V proportional to the temperature. The voltage value from the temperature sensor is subjected to AD conversion by an Analog to Digital converter (AD converter) (not shown) at sampling intervals of, for example, 100 msec and a resultant digital signal is output. The digital signal represents an output voltage and will hereinafter be referred to as temperature data 204. A publicly known technology may be used for the temperature sensor 24 so that a description thereof is omitted. The temperature sensor 24 outputs the temperature data 204 to the offset value computation unit 28 successively.

The angular speed sensor 26 represents, for example, a gyro device such as a vibrational gyro and detects a change in the direction of travel of the vehicle as a relative angular change of the vehicle. In other words, the angular speed sensor 26 detects the angular swing speed of the vehicle. The detected angular speed is output as, for example, an analog signal of 0V-5V. In this process, a positive angular speed corresponding to clockwise circling movement is output as a deviation voltage indicating deviation from 2.5 V toward 5 V, and a negative angular speed corresponding to counterclockwise circling movement is output as a deviation voltage indicating deviation from 0 V toward 2.5 V. 2.5 V represents an offset value, i.e., a zero point, of the angular speed and drifts with temperature or the like.

The sensitivity coefficient (mV/deg/sec) indicating the degree of deviation of the angular speed from 2.5 V is defined as a predetermined value accommodated within an allowable margin of errors in a level condition. The allowable margin of errors is determined by differences between individual gyro devices, time-dependent changes of the gyro device, impact from the temperature, etc. The voltage value of the gyro device is subjected to AD conversion by an AD converter (not shown) at sampling intervals of, for example, 100 msec and a resultant digital signal is output. The digital signal represents the aforementioned output voltage and will hereinafter be referred to as angular speed data 202. A publicly known technology may be used for the gyro device so that a description thereof is omitted. The angular speed sensor 26 outputs the angular speed data 202 to the offset value computation unit 28, the sensitivity coefficient computation unit 30, and the angular speed conversion unit 14.

The offset value computation unit 28 receives the GPS positioning data 200 from the validity determination unit 22, the temperature data 204 from the temperature sensor 24, and the angular speed data 202 from the angular speed sensor 26. The offset value computation unit 28 also receives the sensitivity coefficient 208 from the sensitivity coefficient computation unit 30. The offset value computation unit 28 calculates the offset value of the angular speed sensor 26 (hereinafter, referred to as "offset value 206") based on the GPS positioning data 200, the angular speed data 202, the temperature data 204, and the sensitivity coefficient 208. Details of the process in the offset value computation unit 28 will be described later. The offset value computation unit 28 outputs the offset value 206 to the sensitivity coefficient computation unit 30 and the angular speed conversion unit 14.

The sensitivity coefficient computation unit 30 receives the GPS positioning data 200 from the validity determination unit 22 and the angular speed data 202 from the angular speed sensor 26. Also, the sensitivity coefficient computation unit 30 receives the offset value 206 from the offset value computation unit 28. The sensitivity coefficient computation unit 30 calculates the sensitivity coefficient of the angular speed sensor 26 (hereinafter, referred to as "sensitivity coefficient 208" mentioned above) based on the the GPS positioning data 200, the angular speed data 202, and the offset value 206. To describe it in further details, a sensitivity coefficient derivation unit 90 calculates a temporary sensitivity coefficient of the angular speed sensor 26 as indicated below in the sampling interval of GPS-based orientation, if the GPS-based orientation is indicated to be valid in the GPS positioning data 200.

$$G_{sensitivity}(1/n\Sigma G_{out}-G_{offset})/\Delta\theta \qquad (5)$$

where $G_{offset}$ is received from the offset value computation unit 28 but the offset value 206 may not be readily calculated immediately after the angular speed calculation device 100 is started, for example. In this case, the sensitivity coefficient computation unit 30 uses the offset value 206 determined by the specification of the gyro device as an initial value. Since expression (5) includes division by Δθ, the sensitivity coefficient is calculated when Δθ is equal to or greater than a predetermined value. If the value of Δθ is smaller than the predetermined value, a sensitivity coefficient derivation unit 80 outputs the sensitivity coefficient corrected immediately previously. The sensitivity coefficient computation unit 30 derives the sensitivity coefficient 208 by, for example, filtering the temporary sensitivity coefficient. The sensitivity coefficient computation unit 30 may directly use the temporary sensitivity coefficient as the sensitivity coefficient 208. The sensitivity coefficient computation unit 30 outputs the sensitivity coefficient 208 to the angular speed conversion unit 14.

The angular speed conversion unit 14 receives the angular speed data 202 from the angular speed sensor 26, the offset value 206 from the offset value computation unit 28, and the sensitivity coefficient 208 from the sensitivity coefficient computation unit 30. The angular speed conversion unit 14 calculates the angular speed ω of the vehicle according to expression (1) based on the angular speed data 202, the offset value 206, and the sensitivity coefficient 208. The angular speed conversion unit 14 outputs the angular speed ω.

The features are implemented in hardware such as a CPU of a computer, a memory, or other LSI's, and in software such as a program loaded into a memory, etc. The figure depicts functional blocks implemented by the cooperation of these elements. Therefore, it will be obvious to those skilled in the art that the functional blocks may be implemented in a variety of manners by hardware only or by a combination of hardware and software.

Figure 2:
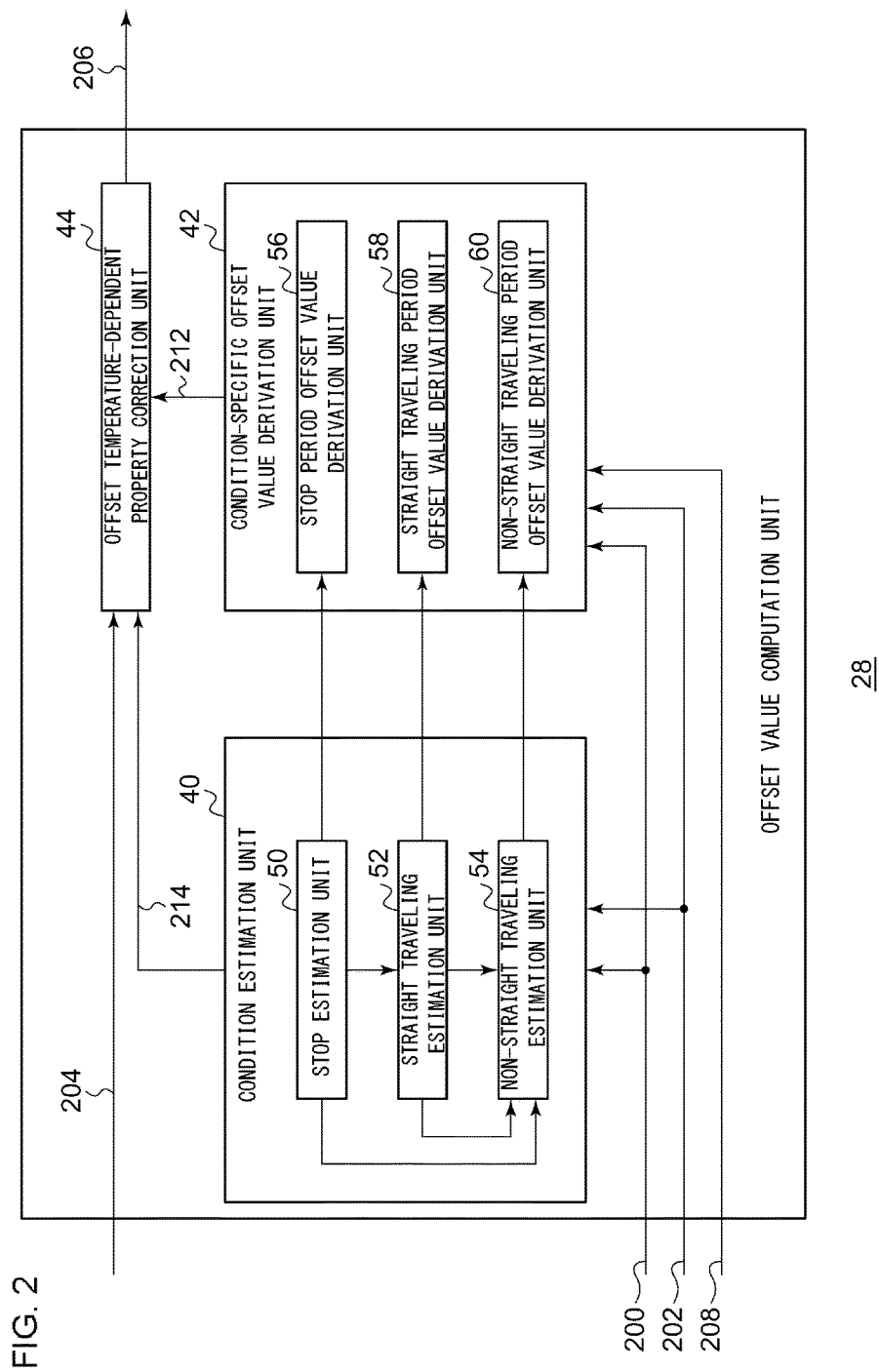
FIG. 2 shows a configuration of the offset value computation unit of FIG. 1.

FIG. 2 shows a configuration of the offset value computation unit 28. The offset value computation unit 28 includes a condition estimation unit 40, a condition-specific offset value derivation unit 42, and an offset temperature-dependent property correction unit 44. The condition estimation unit 40 includes a stop estimation unit 50, a straight traveling estimation unit 52, and a non-straight traveling estimation unit 54, and the condition-specific offset value derivation unit 42 includes a stop period offset value derivation unit 56, a straight traveling period offset value derivation unit 58, and a non-straight traveling period offset value derivation unit 60. The offset value computation unit 28 also includes signals including a temporary offset value 212 and traveling condition information 214.

The condition estimation unit 40 receives the GPS positioning data 200 and the angular speed data 202. The condition estimation unit 40 estimates the traveling condition of the vehicle in the stop estimation unit 50, the straight traveling estimation unit 52, and the non-straight traveling estimation unit 54. If the GPS speed included in the GPS positioning data 200 is valid, an estimation is made as to whether the vehicle is at a stop, traveling in a straight line, or otherwise, i.e., traveling in a non-straight line. If the GPS speed included in the GPS positioning data 200 is invalid, it is determined that the traveling condition cannot be estimated. The condition estimation unit 40 outputs a result of determination as the traveling condition information 214 to the offset temperature-dependent property correction unit 44.

The stop estimation unit 50 acquires the GPS positioning data 200 determined to be valid by the validity determination unit 22 (not shown). Further, the stop estimation unit 50 extracts the GPS speed from the GPS positioning data 200 and verifies whether the GPS speed is "0". Meanwhile, the stop estimation unit 50 calculates a variance value of the angular speed data 202 over a predetermined period of time and compares the variance value with the fourth threshold value. If the GPS speed is 0 and the variance value is smaller than the fourth threshold value, the stop estimation unit 50 determines that the vehicle is at a stop. As mentioned above, the precision of the GPS speed tends to be low if the GPS speed is low. The stop estimation unit 50 determines that the vehicle is at a stop by using the variance value of the angular speed data 202 in conjunction with the GPS speed. For example, the predetermined period of time is defined to be 1 sec, which is the sampling interval of the GPS speed. If the variance value of the angular speed data 202 is small over the predetermined period of time, it is estimated that the vehicle is in a stable condition, free of a rocking motion, for example. If the stop estimation unit 50 determines that the vehicle is not at a stop, the stop estimation unit 50 outputs the determination to the non-straight traveling estimation unit 54.

The straight traveling estimation unit 52 acquires the GPS positioning data 200 determined to be valid by the validity determination unit 22 (not shown). Further, the straight traveling estimation unit 52 extracts the GPS-based orientation from the GPS positioning data 200 and derives a change of the GPS-based orientation over a predetermined period of time (hereinafter, referred to as "GPS-based orientation change"). Still further, the straight traveling estimation unit 52 verifies whether the GPS-based orientation change is "0". Still further, the straight traveling estimation unit 52 calculates a variance value of the angular speed data 202 over the predetermined period of time and compares the variance value with the fifth threshold value. The fifth threshold value may be equal to the fourth threshold value. The predetermined period of time is defined to be a period over which the GPS-based orientation change continues to be 0.

The straight traveling estimation unit 52 determines that the vehicle is traveling in a straight line if the GPS-based orientation change is 0 and the variance value is smaller than the fifth threshold value. If the variance value of the angular speed data 202 is small over the predetermined period of time, it is estimated that the vehicle is traveling in a straight line, free of impacts from small meandering, for example. A straight traveling condition is generally less frequently detected in urban areas than a determination by the stop estimation unit 50 that the vehicle is at a stop, although the frequency depends on the driving situation of the driver or the road configuration. A straight traveling condition lasts for about several seconds. If the straight traveling estimation unit 52 determines that the vehicle is not traveling in a straight line, the straight traveling estimation unit 52 outputs the determination to the non-straight traveling estimation unit 54. If the stop estimation unit 50 determines that the vehicle is at a stop and the straight traveling estimation unit 52 determines that the vehicle is traveling in a straight line, the determination by the stop estimation unit 50 is prioritized.

If the non-straight traveling estimation unit 54 receives a determination that the vehicle is not at a stop from the stop estimation unit 50 and receives a determination that the vehicle is not traveling in a straight line from the straight traveling estimation unit 52, the non-straight traveling estimation unit 54 determines that the vehicle is traveling in a non-straight line.

The condition-specific offset value derivation unit 42 receives the GPS positioning data 200, the angular speed data 202, and the sensitivity coefficient 208. The condition-specific offset value derivation unit 42 derives the temporary offset value 212 of the angular speed sensor 26 successively in accordance with the traveling condition of the vehicle estimated in the condition estimation unit 40. If the stop estimation unit 50 determines that the vehicle is at a stop, the stop period offset value derivation unit 56 derives the temporary offset value 212 successively based on the angular speed data 202. If the straight traveling estimation unit 52 determines that the vehicle is traveling in a straight line, the straight traveling period offset value derivation unit 58 derives the temporary offset value 212 successively based on the angular speed data 202.

If the straight traveling period offset value derivation unit 58 determines that the vehicle is traveling in a non-straight line, the non-straight traveling period offset value derivation unit 60 derives the temporary offset value 212 successively based on the GPS positioning data 200, the angular speed data 202, and the sensitivity coefficient 208. In other words, the stop period offset value derivation unit 56 through the non-straight traveling period offset value derivation unit 60 derive the temporary offset value 212, changing combinations of the GPS positioning data 200, the angular speed data 202, etc. in accordance with the traveling condition of the vehicle.

If it is determined that the vehicle is at a stop, the stop period offset value derivation unit 56 derives the temporary offset value 212 of the angular speed sensor 26 based on the angular speed data 202. To describe it in further details, the stop period offset value derivation unit 56 calculates an average value of the angular speed data 202 as the temporary offset value 212, exploiting the fact that the angular swing speed of the vehicle becomes "0" when the vehicle comes to a stop. If it is determined that the vehicle is traveling in a straight line, the straight traveling period offset value derivation unit 58 derives the temporary offset value 212 of the angular speed sensor 26 successively based on the angular speed data 202. To describe it in further details, the angular swing speed of the vehicle is 0 in this case as well so that the straight traveling period offset value derivation unit 58 calculates an average value of the angular speed data 202 as the temporary offset value 212.

If it is determined that the vehicle is traveling in a non-straight line, the non-straight traveling period offset value derivation unit 60 derives the temporary offset value 212 successively in, for example, the sampling period of the GPS-based orientation, based on the GPS-based orientation in the GPS positioning data 200, the angular speed data 202, and the sensitivity coefficient 208. The temporary offset value 212 is calculated as follows.

$$G_{offset} = 1/n \cdot \tau G_{out} - \Delta\theta \cdot G_{sensitivity} \quad (6)$$

where n denotes the number of samples of the angular speed data 202 in the sampling interval of the GPS-based orientation, and $\Sigma G_{out}$ (mV) denotes a total value of the angular speed data 202 in the sampling interval of the GPS-based orientation. $\Delta\theta$(deg) denotes an amount of change of the GPS-based orientation, and $G_{sensitivity}$ (mV/deg/sec) denotes the sensitivity coefficient 208. Gout corresponds to $V_{out}$ of expression (1), and $G_{sensitivity}$ corresponds to S of expression (1).

Normally, the sensitivity coefficient 208 is fed from the sensitivity coefficient computation unit 30 (not shown). However, the sensitivity coefficient 208 may not be readily calculated immediately after the angular speed calculation device 100 is started, for example. In this case, the non-straight traveling period offset value derivation unit 60 uses the sensitivity coefficient 208 determined by the specification of the gyro device (not shown) as an initial value. Further, the non-straight traveling period offset value derivation unit 60 may use, as an initial value, the sensitivity coefficient 208 from the sensitivity coefficient computation unit 30 saved when the previous driving is completed.

The offset temperature-dependent property correction unit 44 receives the temperature data 204 successively. The offset temperature-dependent property correction unit 44 also receives the traveling condition information 214 output by the condition estimation unit 40 and the temporary offset value 212 derived successively by the condition-specific offset value derivation unit 42. The offset temperature-dependent property correction unit 44 outputs the temporary offset value 212 derived by the condition-specific offset value derivation unit 42 as the offset value 206, except when it is impossible for the traveling condition information 214 to estimate the traveling condition. If it is impossible for the condition estimation unit 40 to estimate the traveling condition, the offset temperature-dependent property correction unit 44 derives the offset value 206 based on the temporary offset value 212 and the temperature data 204 acquired from an acquiring unit. The process in the offset temperature-dependent property correction unit 44 will be described with reference to FIG. 3.

Figure 3:
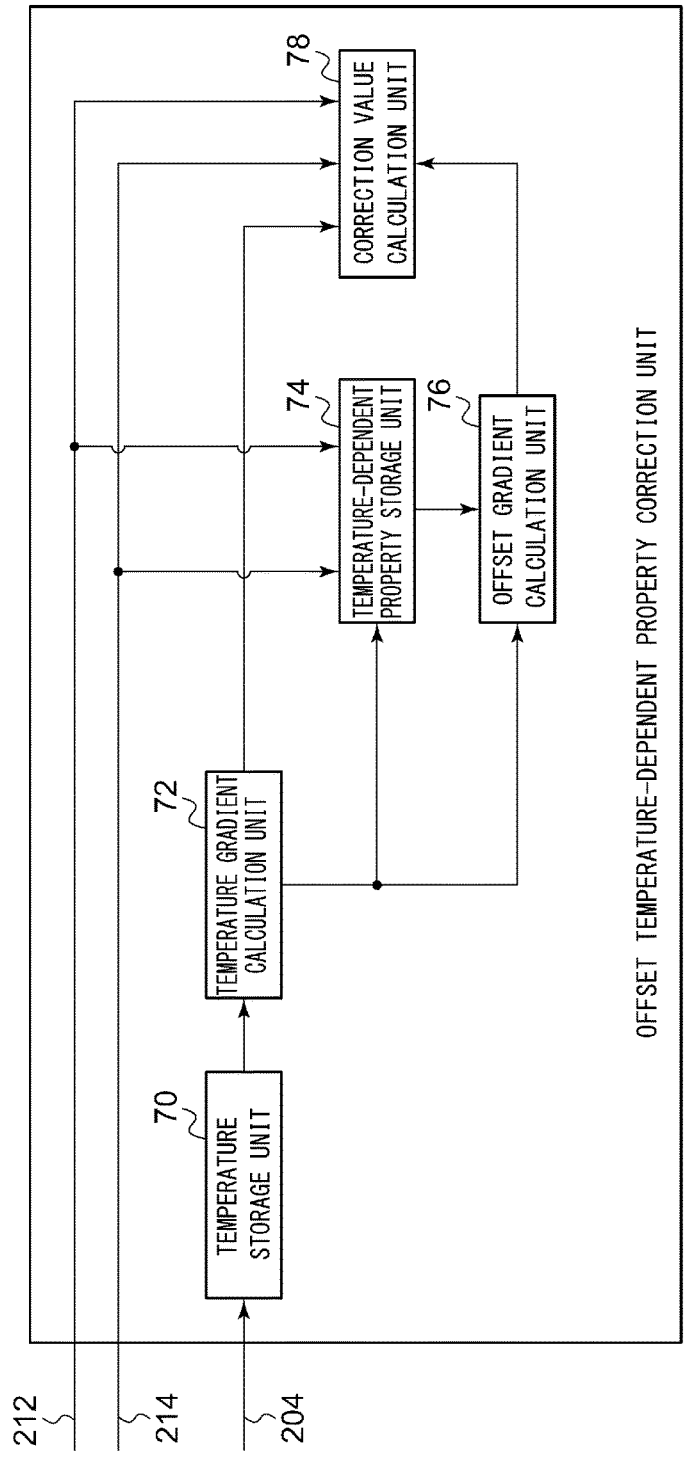
FIG. 3 shows a configuration of the offset value temperature-dependent property correction unit of FIG. 2.
Figures 4, 5:
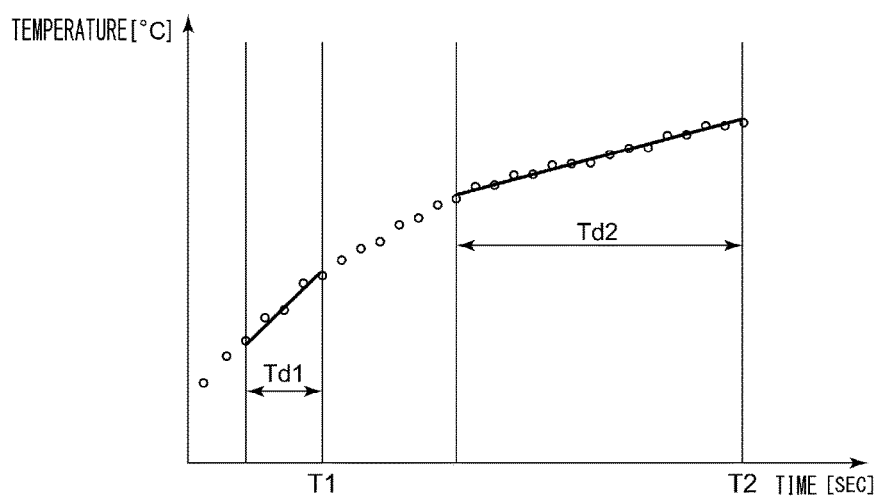
FIG. 4 shows a data structure of a table stored in the temperature storage unit of FIG. 3.
FIG. 5 shows a summary of the process in the temperature gradient calculation unit of FIG. 3.

FIG. 3 shows a configuration of the offset temperature-dependent property correction unit 44. The offset temperature-dependent property correction unit 44 includes a temperature storage unit 70, a temperature gradient calculation unit 72, a temperature-dependent property storage unit 74, an offset gradient calculation unit 76, and a correction value calculation unit 78. The temperature storage unit 70 receives the temperature data 204 successively and stores the temperature data in a ring buffer, etc., associating the temperature data with the time elapsed after the device is started and acquired from a timer function provided in a microcomputer etc. (not shown). FIG. 4 shows a data structure of a table stored in the temperature storage unit 70, showing a relationship between the elapsed time and the temperature data 204. As shown in the figure, the data structure includes a sample number field 300, a time field 302, and a temperature field 304. The time field 302 stores the elapsed time occurring when the temperature storage unit 70 receives the temperature data 204. The received temperature data 204 is entered in the temperature field 304. The temperature storage unit 70 outputs the time and the temperature data 204 stored to the temperature gradient calculation unit 72.

The temperature gradient calculation unit 72 uses the time and the temperature data 204 received from the temperature storage unit 70 for functional approximation so as to calculate the gradient of the temperature. A description will be given here of a method of using the least square method to approximate the gradient with a linear function, plotting the time along the X-axis and the temperature along the Y-axis. Applying the least square method, the temperature gradient $\gamma T_n$ (° C./sec) and the intercept $\alpha T_n$ (° C.) are calculated as follows.

$$\gamma T_n = \frac{ta_n \sum_{k=1-ta_n}^{0} t_{n+k} T_{n+k} - \sum_{k=1-ta_n}^{0} t_{n+k} \sum_{k=1-ta_n}^{0} T_{n+k}}{ta_n \sum_{k=1-ta_n}^{0} t_{n+k}^2 - \left(\sum_{k=1-ta_n}^{0} t_{n+k}\right)^2} \quad (7)$$

$$\alpha T_n = \frac{\sum_{k=1-ta_n}^{0} t_{n+k}^2 \sum_{k=1-ta_n}^{0} T_{n+k} - \sum_{k=1-ta_n}^{0} t_{n+k} T_{n+k} \sum_{k=1-ta_n}^{0} t_{n+k}}{ta_n \sum_{k=1-ta_n}^{0} t_{n+k}^2 - \left(\sum_{k=1-ta_n}^{0} t_{n+k}\right)^2} \quad (8)$$

where the suffix "n" denotes the sample number shown in FIG. 4, $ta_n$ denotes the number of samples to which the least square method is applied, $t_n$ (sec) and $T_n$ (° C.) denote the time and temperature shown in FIG. 4, respectively. $ta_n$ is calculated as follows.

$$ta_n = [Tc/|\gamma T_{n-1}| \cdot fs] \quad (9)$$

Tc (° C.) denotes the temperature. For example, Tc denotes a value such as 0.3° C. larger than the resolution of the temperature sensor 24. fs (Hz) denotes a sampling frequency of the temperature sensor 24. If $\gamma T_{n-1}$ is not calculated yet immediately after the angular speed calculation device 100 is started, for example, or if the absolute value of the temperature gradient $\gamma T_{n-1}$ is large and the number of samples $ta_n$ is small, a predetermined value (e.g., 10 samples) may be used for $ta_n$. If the temperature gradient $\gamma T_{n-1}$ approximates 0, $ta_n$ approximates infinite. Therefore, if the absolute value of $\gamma T_{n-1}$ is equal or less than 0.03 (° C./sec), a predetermined value (e.g., 100 samples) may be used for $ta_n$. Thus, the number of samples required for the temperature change to reach Tc is determined according to expression (9) based on the temperature gradient $\gamma T_{n-1}$ previously calculated.

FIG. 5 shows a summary of the process in the temperature gradient calculation unit 72. As shown in FIG. 5, the temperature gradient is smaller at time T2 than at time T1. According to expression (9), the gradient at time T1 is calculated from the samples included in a period Td1, and the gradient at time T2 is calculated from the samples included in a period T2d longer than the period Td1. The period Td is a period of time in which the temperature gradient is calculated and is derived by dividing the number of samples $ta_n$ by the sampling frequency fs (Hz). Thus, the temperature gradient calculation unit 72 adjusts the period of time in which the temperature gradient is calculated subsequently, based on the temperature gradient calculated already. Reference is made back to FIG. 3.

Further, the temperature gradient calculation unit 72 calculates the temperature T(t) at a given point of time as follows.

$$T(t) = \gamma T_n \cdot t + \alpha T_n \quad (10)$$

The temperature gradient calculation unit 72 outputs the calculated temperature (T) and the temperature gradient $\gamma T_n$ to the temperature-dependent property storage unit 74. The temperature gradient calculation unit 72 also outputs the temperature gradient $\gamma T_n$ to the correction value calculation unit 78 and outputs the temperature T(t) to the offset gradient calculation unit 76.

Figures 6, 7:
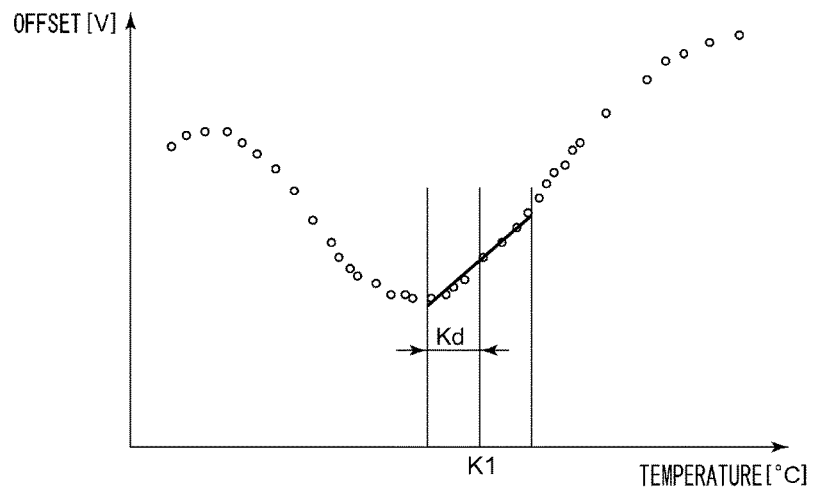
FIG. 6 shows a data structure of a table stored in the temperature-dependent property storage unit of FIG. 3.
FIG. 7 shows a summary of the process in the offset gradient calculation unit of FIG. 3.

The temperature-dependent property storage unit 74 receives the temporary offset value 212, the traveling condition information 214, the temperature T(t), and the temperature gradient $\gamma T_n$ successively, and creates and stores a temperature-dependent property table for offsets. FIG. 6 shows a data structure of a table stored in the temperature-dependent property storage unit 74. As shown in the figure, the data structure includes a temperature range field 400, a validity flag field 402, an average temperature field 404, and an average offset value field 406. First, the temperature-dependent property storage unit 74 calculates a sampling interval to take samples entered in the average temperature field 404 and the average offset value field 406. The sampling interval $tb_n$ (sec) is calculated as follows.

$$tb_n = Td/|\gamma T_n| \quad (11)$$

where Td (° C.) denotes a temperature range in the temperature range field 400. In the example shown in FIG. 6, the temperature range of 0.5 (° C.) in the temperature range field 400 is substituted into Td of expression (11) so as to calculate the sampling interval. The upper limit of the temperature gradient $\gamma T_n$ is defined so that the sampling interval $tb_n$ is not smaller than the sampling interval of the temporary offset value 212. For example, given that the sampling interval of the temporary offset value 212 is 1 (sec), the upper limit of the absolute value of the temperature gradient $\gamma T_n$ is set to 0.5 (° C./sec). Also, the lower limit of the temperature gradient $\gamma T_n$ is set to, for example, 0.01 (° C./sec) so that the sampling interval of the temporary offset value 212 is not more than 50.

The temperature-dependent property storage unit 74 subjects the temperature T(t) to a statistical process at the sampling interval $tb_n$ calculated according to expression (11) and subjects the temporary offset value 212 to a statistical process. To describe it in further details, the temperature-dependent property storage unit 74 refers to the temperature T(t) received at the sampling interval $tb_n$ to calculate a weighted average and also calculates a weighted average of the temporary offset value 212. If number of sets of traveling condition information 214 are received, the weight coefficient to calculate the weighted averages is set to "0.8" if the traveling condition information 214 indicates that the vehicle is at a sop or traveling in a straight line. The weight coefficient is set to "0.2", if the vehicle is traveling in a non-straight line, and set to "0" if it is impossible to estimate the traveling condition. The average values are calculated accordingly. If the received traveling condition information 214 indicates that the vehicle is at a stop, traveling in a straight line, or traveling in a non-straight line, the averaging process is performed.

The temperature-dependent property storage unit 74 searches the temperature range field 400 for a row corresponding to the calculated temperature T(t). If the entry in the validity flag field 402 is 0, the temperature-dependent property storage unit 74 changes the flag to 1, stores the temperature T(t) in the average temperature field 404, and stores the temporary offset value 212 in the average offset value field 406. If the entry in the validity flag field 402 is 1, the temperature-dependent property storage unit 74 calculates an average of the calculated T(t) and the average temperature stored in the average temperature field 404 and stores the calculated result in the average temperature field 404 as a new average temperature. It can therefore be said that the temperature gradient calculation unit 72 and the temperature-dependent property storage unit 74 calculate an average temperature based on the temperature gradient. Moreover, the temperature-dependent property storage unit 74 calculates an average of the temporary offset value 212 and the average offset value stored in the average offset value field 406 and stores the calculated result in the average offset value field 406 as a new average offset value. The temperature-dependent property storage unit 74 outputs the temperature-dependent property table to the offset gradient calculation unit 76.

The offset gradient calculation unit 76 receives the temperature T(t) from the temperature gradient calculation unit 72 and receives the temperature-dependent property table from the temperature-dependent property storage unit 74. The offset gradient calculation unit 76 calculates the offset gradient at the temperature T(t). To describe it in further details, the offset gradient calculation unit 76 refers to the temperature range field 400 in the temperature-dependent property table and identifies a temperature range in which the entry in the validity flag field 402 is "1" in a predetermined range around the temperature T(t) (e.g., in a range T(t)±2). Moreover, the offset gradient calculation unit 76 acquires the average temperature and the average offset value in the identified temperature range.

Further, the offset gradient calculation unit 76 uses the the average temperature and average offset value for functional approximation so as to calculate the offset gradient. A description will be given here of a method of using the least square method to approximate the gradient with a linear function, plotting the average temperature along the X-axis and the average offset value along the Y-axis. Applying the least square method, the offset gradient $\gamma G_n$ (mV/° C.) is calculated as follows.

$$\gamma G_n = \frac{m \sum_{k=1}^{m} Ta_k Ofs_k - \sum_{k=1}^{m} Ta_k \sum_{k=1}^{m} Ofs_k}{m \sum_{k=1}^{m} Ta_k^2 - \left(\sum_{k=1}^{m} Ta_k\right)^2} \quad (12)$$

where m denotes the number of sets of average temperature and average offset values for which the entry in the validity flag field 402 is 1. The offset gradient calculation unit 76 performs functional approximation if m is equal to greater than 3, which is a threshold. Ta (° C.) denotes the average temperature entered in the average temperature field 404, and Ofs denotes the average offset value entered in the average offset value field 406. In other words, offset gradient calculation unit 76 calculates the gradient of the offset value based on the temperature gradient calculated in the temperature gradient calculation unit 72, the average temperature, and the temporary offset value 212 derived in the offset value derivation unit.

FIG. 7 shows a summary of the process in the offset gradient calculation unit 76. The graph shows an example of offset gradient calculated by the offset gradient calculation unit 76. Given the input average temperature T(t) of K1, functional approximation is performed in a range K1±Kd so as to calculate the offset gradient. Reference is made back to FIG. 3. The offset gradient calculation unit 76 outputs the offset gradient $\gamma G_n$ calculated according to expression (12) to the correction value calculation unit 78.

The correction value calculation unit 78 receives the temporary offset value 212, the traveling condition information 214, the temperature gradient $\gamma T_n$, and the offset gradient $\gamma G_n$ so as to calculate the offset value. The correction value calculation unit 78 outputs the temporary offset value 212 as the offset value 206 if the traveling condition information 214 indicates that the vehicle is at a stop, traveling in a straight line, or traveling in a non-straight line. Meanwhile, if the traveling condition information 214 indicates that it is impossible to estimate the traveling condition, the correction value calculation unit 78 calculates the offset value 206 based on the offset gradient $\gamma G_n$ and the temperature gradient $\gamma T_n$.

$$G_{offset}(n) = G_{offset}(n-1) + \gamma G_n \cdot \gamma T_n \cdot tc \quad (13)$$

where tc (sec) denotes an interval in which the correction value calculation unit 78 calculates the offset value and is, for example, 1 (sec).

Figure 8:
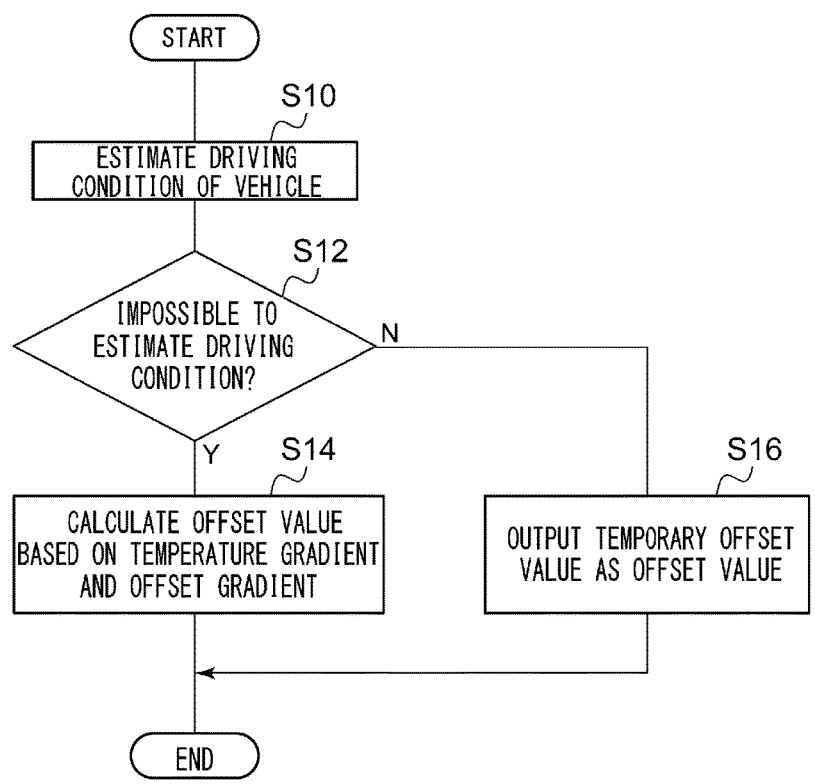
FIG. 8 is a flowchart for the steps of deriving the offset value by the angular speed calculation device of FIG. 1.

A description will be given of the operation of the angular speed calculation device 100 having the configuration described above. FIG. 8 is a flowchart for the steps of deriving the offset value in the angular speed calculation device 100. The condition estimation unit 40 estimates the traveling condition of the vehicle (S10). If it is impossible to estimate the traveling condition (Y in S12), the offset temperature-dependent property correction unit 44 calculates the offset value 206 based on the temperature gradient and the offset gradient (S14). Meanwhile, if it is possible to estimate the traveling condition (N in S12), the offset temperature-dependent property correction unit 44 outputs the temporary offset value 212 as the offset value 206 (S16).

According to the embodiment, a temperature difference is derived by referring to the temperature gradient obtained by using temperature data for functional approximation, and the offset value is derived based on the temperature difference. Therefore, drifts of offset values are followed with high precision. Further, the range of functional approximation using temperature data is determined based on the temperature gradient derived in the past. Therefore, the temperature difference can be derived with high precision. In creating the temperature-dependent property table, the interval to sample temperature-dependent property data is derived from the temperature gradient obtained by functional approximation using the temperature data. Therefore, the process is simplified. The temperature-dependent property data is generated from the temperature obtained by functional approximation using the temperature data. Therefore, the temperature-dependent property is derived with high precision. Further, the temperature-dependent property data is weighted based on the traveling condition. Therefore, the temperature-dependent property is derived with high precision.

Further, the offset gradient is calculated by functional approximation using the offset value such that the interval in which to perform functional approximation is determined based on the temperature obtained by functional approximation using the temperature data. Therefore, the offset gradient is derived with high precision and the offset value is corrected with high precision. The period of time in which the sensor temperature is functionally approximated is changed based on the temperature gradient of the angular speed sensor. Therefore, the temperature and temperature difference are derived with high precision and the precision of correcting the offset of the angular speed sensor is improved.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment, the condition estimation unit 40 estimates that traveling condition such that it determines whether the vehicle is at a stop by using the GPS speed included in the GPS positioning data 200. Alternatively, the condition estimation unit 40 may receive vehicle speed pulses of the vehicle from a pulse detector (not shown) and determine that the vehicle is at a stop based on the vehicle speed pulses. The pulse detector is connected to a speed sensor (not shown). The speed sensor is provided in the middle of a speed meter cable rotated in accordance with the rotation of the drive shaft, and outputs a vehicle speed signal associated with the rotation of the drive shaft. According to the embodiment, the vehicle speed can be measured by a variety of means.

In the embodiment, the validity determination unit 22 uses PDOP to determine the validity off the GPS positioning data 200. Alternatively, the validity determination unit 22 may use Geometric Dilution Of Precision (GDOP), Horizontal Dilution Of Precision (HDOP), or a combination thereof. According to this variation, a variety of parameters can be used for determination.

What is claimed is:

1. An angular speed sensor correction device comprising:
    an acquisition unit that acquires positioning data for a target positioned based on a signal from a GPS satellite, an angular speed of the target output from an angular speed sensor, and a temperature of the target output from a temperature sensor;
    an offset value derivation unit that derives a temporary offset value of the angular speed sensor based on the positioning data and the angular speed acquired by the acquisition unit; and
    an offset value correction unit that derives the offset value of the angular speed sensor based on the temporary offset value of the angular speed sensor derived by the offset value derivation unit and the temperature acquired by the acquisition unit, wherein the offset value correction unit comprises:
        a temperature gradient calculation unit that calculates a temperature gradient based on the temperature acquired by the acquisition unit and calculates an average temperature based on the temperature gradient;
        an offset gradient calculation unit that calculates an offset value gradient based on the temperature gradient and the average temperature calculated by the temperature gradient calculation unit and on the temporary offset value of the angular speed sensor derived by the offset value derivation unit; and
        a correction value calculation unit that calculates the offset value of the angular speed sensor based on the offset value gradient calculated by the offset gradient calculation unit and the temperature gradient calculated by the temperature gradient calculation unit; and
    wherein the temperature gradient calculation unit adjusts a period of time that should elapse before the temperature gradient is calculated next time, based on the temperature gradient already calculated.

2. The angular speed sensor correction device according to claim 1, further comprising:
    a condition estimation unit that determines whether the target is at a stop based on the positioning data and the angular speed acquired by the acquisition unit,
    wherein the offset value correction unit outputs the offset value of the angular speed sensor calculated by the correction value calculation unit when the target is not at least one of: a stop, traveling in a straight line, or traveling in a non-straight line, and outputs the temporary offset value of the angular speed sensor derived by the offset value derivation unit as the offset value of the angular speed sensor except when the target is not at least one of: a stop, traveling in a straight line, or traveling in a non-straight line.

3. An angular speed sensor correction method comprising:
    acquiring positioning data for a target positioned based on a signal from a GPS satellite, an angular speed of the target output from an angular speed sensor, and a temperature of the target output from a temperature sensor;
    deriving a temporary offset value of the angular speed sensor based on the positioning data and the angular speed acquired;
    deriving the offset value of the angular speed sensor based on the temporary offset value of the angular speed sensor derived and the temperature acquired, wherein the deriving of the offset value comprises:
        calculating a temperature gradient based on the temperature acquired and calculating an average temperature based on the temperature gradient;
        calculating an offset value gradient based on the temperature gradient and the average temperature calculated and on the temporary offset value of the angular speed sensor derived; and
        calculating the offset value of the angular speed sensor based on the offset value gradient calculated and the temperature gradient calculated; and
    adjusting a period of time that should elapse before the temperature gradient is calculated next time, based on the temperature gradient already calculated.

* * * * *